United States Patent Office 3,677,736 Patented July 18, 1972

1

3,677,736
LIQUID FERTILIZER SUSPENSION CONTAINING UREAFORM

Richard E. Formaini, Hopewell, Va., assignor to Allied Chemical Corporation, New York, N.Y.

No Drawing. Continuation of application Ser. No. 56,689, July 20, 1970, which is a continuation-in-part of application Ser. No. 827,033, May 22, 1969, which in turn is a continuation of application Ser. No. 643,845, June 6, 1967. This application June 8, 1971, Ser. No. 150,931
Int. Cl. C05c *9/00*
U.S. Cl. 71—28 3 Claims

ABSTRACT OF THE DISCLOSURE

A liquid fertilizer suspension containing ureaform having a water insoluble nitrogen content of at least 1.5% and an activity index in excess of 60. The process for producing said suspension is concerned with diluting a urea-formaldehyde reaction product containing urea and formaldehyde having a mole ratio between 1:1 to 2:1 with water to form a 35–65% urea-formaldehyde solution, lowering the pH to below 5, heating said solution at a temperature ranging from 30–80° to form a suspension and adding an alkaline material to said suspension to raise the pH to above 5.

CROSS-REFERENCE TO RELATED APPLICATION

This application is a continuation of Ser. No. 56,689 filed July 20, 1970 now abandoned which is a continuation-in-part of my application Ser. No. 827,033, filed May 22, 1969, now abandoned which is a continuation of my application Ser. No. 643,845, filed June 6, 1967, now abandoned.

BACKGROUND OF THE INVENTION

This invention relates to an improved process for the preparation of a liquid fertilizer and the resultant product therefrom. More particularly it relates to the preparation of liquid fertilizers having high quality ureaform suspended therein.

Liquid mixed fertilizers are solutions of compounds which, for the most part, are very soluble in water and supply at least two of the primary plant nutrients; namely, nitrogen, phosphorus measured as $P_2O_5$, and potash measured as $K_2O$. The present invention is directed primarily to solutions containing both nitrogen and $P_2O_5$, with or without potash.

Ureaform is a term which is used in the fertilizer art to denote mixtures of compounds of different degrees of solubility formed by the reaction of urea and formaldehyde under acid conditions, particularly when the reaction mixture contains at least 1 mol of urea per mol of formaldehyde, and preferably more. The over-all solubility of this material is quite low thereby precluding the product from forming highly concentrated solutions which have a tendency to burn vegetation. Moreover, when used as a fertilizer, the nitrogen therein becomes available as a plant nutrient over a prolonged period of time so that unusually heavy applications of the material may be made without damaging or over-feeding plant life.

The rate of nitrification of a relatively insoluble ureaform fertilizer is indicated by its activity index which, in effect, is a measure of its agronomic quality. To be of value as a ureaform fertilizer, according to the Association of American Fertilizer Control Officials, the activity index must be at least 40. However, it is apparent that an activity index of 60 or even higher is very desirable. For purposes of this invention, the activity index was determined in accordance with the procedure given in paragraph 2.063 of the Official Methods of Analysis of the Association of Official Agricultural Chemists," tenth edition, 1965.

2

A liquid suspension of ureaform has the advantage that one application will provide a supply of quickly available nutrients along with a reserve of slowly available nitrogen. Furthermore, the suspended ureaform particles, upon being applied to the soil or lawn, will remain visible thereon and therefore serve as a visible indicator to show which parts of the area have been sprayed with the liquid fertlizer mixture and which still require treatment.

It has been proposed in U.S. Pat. 3,096,168, patented July 2, 1963, to prepare suspensions of ureaform in liquid mixed fertilizers by a process which comprises mixing specified proportions of water and soluble fertilizer ingredients and reacting therein 1–2.5 mols of urea per mol of formaldehyde under acidic conditions to form a ureaform product. This procedure has several limitations. Particularly, the activity index of the ureaform is a problem because it is often quite low and tends to fall below 40 whenever the urea and formaldehyde are fully reacted to form water-insoluble ureaform. Also, the relatively low temperature at which the reaction must be carried out to achieve an activity index of 40 normally results in a slow conversion of the reactants to ureaform. Typically, an active product of this patented process contained only 1.8% water-insoluble nitrogen. Attempts to prepare a more fully reacted product containing 4.45% water-insoluble nitrogen resulted in a low activity index of 20.

It is an object of this invention to provide an improved process for effectively converting urea and formaldehyde to a water-insoluble ureaform having a high activity index in a simple and economical manner.

It is another object of this invention to produce a ureaform suspension having about 1.5–10% water-insoluble nitrogen.

It is still another object of this invention to produce a ureaform suspension having an activity index in excess of 60.

Other objects and advantages of the present invention will be evident from the following description of the invention.

SUMMARY OF THE INVENTION

In accordance with the present invention, an aqueous urea-formaldehyde reaction product having a pH above 7 and containing urea-formaldehyde in a mol ratio between 1:1 to 2:1, which has been heat reacted in the presence of 0.3 to 6% by weight ammonia is diluted with water to a urea-formaldehyde concentration of 35–65% and adjusted to a pH not over 5, preferably to a pH between 1 and 4. The resulting mixture is agitated and heat reacted at 30–80° C., preferably at 50–70° C., until a fluid pumpable slurry is formed and the water-insoluble nitrogen content of the mixture is between 1.5% and 10%. Reaction is normally complete in 15–80 minutes depending on reaction temperature. The resulting slurry is neutralized and cooled to ambient temperature. Soluble plant food ingredients may be added if desired. The product has an activity index in excess of 60.

The pH of the starting material should be above 7 in that this prevents any premature formation of ureaform or other products formed by side reactions.

Although any liquid non-resinous urea-formaldehyde reaction product having the composition called for above may be suitably employed as the intermediate product in the process, it is preferred to use a liquid urea-formaldehyde reaction product in which substantially all of the formaldehyde is in combined form. Such an intermediate product may be prepared by the process described in U.S. Pat. 3,462,256.

An acid or acid forming compound is added to the intermediate product so as to lower the pH to below 5, preferably within the range of 1–4. As the pH is lowered to below 5, the rate of reaction between the urea and formaldehyde to form ureaform is increased. However, when the pH is lowered to below 1, the acid attacks and destroys the urea before its combination with formaldehyde. Furthermore, the urea-formaldehyde compounds obtained are highly insoluble and udesirable.

Any organic or inorganic acids which will lower the pH may be used in this reaction. Examples of such acids are phosphoric acid, nitric acid, sulfuric acid, hydrochloric acid, acetic acid, and oxalic acid. Furthermore, organic esters which hydrolyze to form an acid which will lower the pH such as the organic ester of phosphoric acid, are acceptable. Moreover, ammonium salts, such as ammonium chloride, may be employed to bring about the desired change in pH of the starting material. Since the product is to be used as a fertilizer, it is preferable to use compounds which will add phosphorous or ammonium to the starting material.

The starting material is heated generally for 15–80 minutes at 30–80° C. and preferably at 15–45 minutes at 40–70° C. It was found that at below 30° C. the reaction proceeded at a very slow rate. At about 80° C., highly insoluble compounds were formed which resulted in the product having an activity index below 60. It was found that at between 40–70° C., the best reaction rate was obtained at most mol ratios of urea to formaldehyde. It should be noted that in this respect as the mol ratio of urea to formaldehyde goes from 1:1 to 2:1, the reaction time to produce the desired product increases. The reaction time may be maintained at the same level for a larger mol ratio of urea to formaldehyde when the reaction temperature is increased, provided the reaction temperature does not exceed 80° C. It should also be noted that as the reaction time exceeds 60 minutes, the activity index of the resulting product will have a tendency to go below 60 for a urea-formaldehyde mole ratio in the area of 1:1. However, as the urea-formaldehyde mole ratio approaches 2:1, a reaction time of up to 80 minutes may be used to obtain a product having an activity index in excess of 60. For mol ratios of urea to formaldehyde near the center of the range of 1:1 to 2:1 at about 60° C. reaction temperature, the desired product may be obtained in 15 minutes, reaction time. Although a product may be obtained having a high activity index in shorter reaction times than 15 minutes, it is unlikely that such product will have an insoluble-nitrogen content of at least 1.5%. Furthermore, in this same range of mol ratios, the reaction time should not exceed one hour and preferably 45 minutes to obtain the desired product. It is obvious that economically the shortest period of time possible to obtain the desired product is desirable.

Agitation during the reaction period is important in order to obtain finely divided ureaform products and thus a satisfactory suspension. If there is insufficient agitation, highly insoluble nitrogen compounds are formed with an activity index less than 60. High-shear agitation, such as a turbine type of agitator with baffles, is preferably used whenever the ureaform reaction is carried out at a reaction temperature below 60° C. However, agitation by a pump or impeller type of agitator is satisfactory when the reaction is performed at temperatures above about 60° C.

At the end of the reaction time alkaline material is added to the reaction mixture to raise the pH above 5 and thus terminate the reaction for producing ureaform. The reaction mixture is then cooled to ambient temperature. Any alkaline material that will raise the pH is satisfactory for this purpose. Examples of such materials are ammonia, aqueous ammonia, potassium carbonate, sodium hydroxide, potassium hydroxide, ammonium carbonate and diammonium phosphate. Again since the liquid suspension product is to be used as a fertilizer, it is preferable to add ammonia, phosphate, or potassium alkaline materials to raise the pH of the reaction mixture. The pH of the product should not be raised above 8. If the product suspension has a pH above 8 the alkalinity tends to attack the container and introduce impurities into the mixture. Furthermore, the excess alkalinity attacks the urea in the product suspension.

By this procedure, N, N—$P_2O_5$, N—$P_2O_5$—$K_2O$ or N—$K_2O$ fertilizers can be made. The nitrogen may be obtained entirely or in part from the urea-formaldehyde intermediate. Whenever supplemental nitrogen is desired, it may be added as ammonia or as salts such as ammonium phosphate. The phosphorous may be added as phosphoric acid or in the form of ammonium phosphates. Potassium is usually supplied as potassium chloride. Normally, the supplemental plant food ingredients are added after acidic reaction of the urea-formaldehyde to form ureaform suspensions because of better control of pH condtiions. However, the order of addition may be reversed, if desired, providing reaction conditions are maintained within the ranges stated. Generally, the quantity of salts added are limited to an amount which would not supersaturate the final product at temperatures encountered in storage.

The quantity and quality of the ureaform in suspension is controlled by the variation of urea to formaldehyde mol ratio and by reaction conditions. Mol ratio may be adjusted within the range stated previously by adding small amounts of urea or formaldehyde to the urea-formaldehyde intermediate.

The reaction conditions affecting ureaform quantity and quality are time, temperature, pH and concentrations. Within the ranges of the reaction conditions, stated previously, the ureaform quantity increases by a decrease in pH, as well as by an increase in concentration, temperature and reaction time. Generally the activity index of the product is lower with an increase of ureaform quantity.

DESCRIPTION OF THE PREFERRED EMBODIMENTS

The following examples illustrate modes of carrying out the process of the present invention. All parts and percentages are by weight unless otherwise specified.

EXAMPLE 1

About 12,540 parts of a 50% aqueous urea solution, 3,913 parts of a 50% aqueous formaldehyde solution, 500 parts of a 30% aqueous ammonia and 17.5 parts of a 20% aqueous sodium hydroxide solution were mixed with stirring in a reaction tank. The reaction tank was equipped with heating and cooling facilities and a pH controller to feed caustic solution. Upon mixing, the temperature of the solution was 40° C. and the pH was 9.0. The solution was then heated to 90° C. at a rate of 2° C. per minute and maintained at 90° C. for 125 minutes. During the first 85 minutes of this period, the pH was kept between 9.0 and 9.5 by continuous addition of 20% sodium hydroxide solution. At this time the solution contained 350 parts of 20% sodium hydroxide solution. When addition of sodium hydroxide was stopped, the reaction pH dropped, and at the end of the cook period the pH of the solution had fallen to 7.7. The resulting clear solution was cooled to 40° C. and concentrated at 45° C. under vacuum by removing 7,477 parts of water. The product was stabilized by adding 167 parts of 30% aqueous ammonia solution. The clear product had the following composition based on materials added; 2% ammonia, 62.7% urea, 19.6% formaldehyde, 0.7% sodium hydroxide and 15% water. The urea to formaldehyde mol ratio was approximately 1.6 to 1.0, and total nitrogen was about 30.9%. Analyses indicated that essentially all of the formaldehyde was in combined form.

EXAMPLE 2

A 20–5–0 fertilizer was prepared as follows: 606 parts of solution from Example 1 was mixed with 239 parts water and 86 parts of 85% phosphoric acid, and the mixture was stirred. The pH of the mix was 2.8 at 36° C., and solids were allowed to form for 46 minutes after acid addition. Then 69 parts of 28% aqua ammonia was added to stop the ureaform reaction by raising pH to above 5.5. The cooled product was fluid and easy to pump. It contained 20.7% total nitrogen and 1.9% water-insoluble nitrogen having an activity index of 78. The nonwater ingredients were about 62% of the weight of product. The relatively low water-insoluble nitrogen content of the product shows that the reaction time of 46 minutes was too short for complete reaction at reaction temperature of 36° C.; however, the product ureaform was found to be a desirable, unusually active, slowly-available fertilizer.

EXAMPLE 3

This example shows conditions for high conversion of urea nitrogen to water-insoluble nitrogen. A 20–5–0 fertilizer was prepared using the same quantities of ingredients specified in Example 2. The same procedure was used except that the ureaform reaction was carried out for 24 minutes at 60° C. After cooling the product to 25° C., the mixture was thick but could be pumped. The material contained 4.9% water-insoluble nitrogen having an activity index of 70. The nonwater ingredients were about 62% of product weight.

EXAMPLE 4

This example shows that a relatively low reaction temperature will give a high yield of water-insoluble nitrogen within 56 minutes if reaction pH is low, i.e., if a relatively large quantity of acid is used in the reaction mixture. A 14–7–7 fertilizer was made as follows: 431 parts of urea-formaldehyde solution from Example 1 was mixed with stirring with 310 parts of water and 114 parts of 85% phosphoric acid. The pH was 2.5 at 36° C. The heat of reaction was sufficient to maintain the reaction temperature in the range of 36° C. to 41° C. After 56 minutes at this reaction temperature, 32 parts of 28% aqua ammonia and 113 parts of potassium chloride (62% $K_2O$ equivalent) were added, and the slurry was cooled to 25° C. The product was quite fluid and pumpable. The material contained 5.1% water-insoluble nitrogen having an activity index of 60. Nonwater ingredients were about 59% of product weight.

EXAMPLE 5

This example shows that urea may be added to the reaction mixture without loss of normal high activity index of the product. A 16–8–8 fertilizer was produced by mixing 427 parts of urea-formaldehyde solution from Example 1, 228 parts of water, 36 parts of urea and 130 parts of 85% phosphoric acid. The stirred mixture had a pH of 2.35 at 39° C. The heat of reaction to produce ureaform solids maintained temperature between 39° and 43° C. After a reaction time of 60 minutes, 50 parts of 28% aqua ammonia and 129 parts of potassium chloride (62% $K_2O$ equivalent) were added. The pH was increased from 2.6 to 5.65. The slurry was cooled to 25° C. It was fluid and pumpable. The material contained 4.2% water-insoluble nitrogen having an activity index of 65. The urea to formaldehyde mol ratio was about 1.8 to 1. Nonwater ingredients were 65% of product weight.

EXAMPLE 6

The following example indicates that when reaction temperature exceeds about 80° C., the activity index of the product tends to fall below 40. About 800 parts of solution from Example 1 and 800 parts of water were mixed with a laboratory stirrer set at low speed. Approximately 101 parts of 75% phosphoric acid was added to lower pH to 2.8 at 30° C. and cause ureaform to precipitate. The mixture was heated to 85° C. and allowed to react for 60 minutes, during which time the pH had risen to 5.9. The mixture was cooled to 25° C. and analyzed. The suspension contained 3.1% water-insoluble nitrogen having an activity index of 21.

Although certain preferred embodiments of the invention have been disclosed for purpose of illustration, it will be evident that various changes and modifications may be made therein without departing from the scope and spirit of the invention.

It is claimed:

1. A process for producing a liquid fertilizer suspension containing ureaform having a water-insoluble nitrogen content of 4.9% and an activity index of 70 which comprises:

(a) preparing an aqueous mixture of urea and formaldehyde a urea:formaldehyde mol ratio of 1.6;
(b) adding ammonia in an amount of 1.8% by weight;
(c) heating said mixture at a temperature between about 75° C. and boiling while maintaining the pH of said mixture in the range about 8.5 to 10 by the addition of strong alkali until at least 90% of the formaldehyde is in combined form, with at least 60% in the form of methylol compounds;
(d) discontinuing the addition of alkali and continuing said heating until at least 50% and no more than 80% of the formaldehyde is in the form of methylene groups;
(e) diluting with water the resulting reaction product to about 35–65% by weight of urea-formaldehyde;
(f) adding an acidic material to said reaction product to adjust the pH thereof to 2.8 at 36° C.;
(g) heating the acidified reaction product to a temperature of 60° C. for 24 minutes; and
(h) adding an alkaline material to said heated reaction product so as to raise the pH to between 5 and 8 to produce a ureaform suspension having a water-insoluble nitrogen content of 4.9% and an activity index of 70.

2. A process for producing a liquid fertilizer suspension containing ureaform having a water-insoluble nitrogen content of 5.1% and an activity index of 60 which comprises:

(a) preparing an aqueous mixture of urea and formaldehyde having a urea:formaldehyde mol ratio of 1.6;
(b) adding ammonia in an amount of 1.8% by weight;
(c) heating said mixture at a temperature between about 75° C. and boiling while maintaining the pH of said mixture in the range about 8.5 to 10 by the addition of strong alkali until at least 90% of the formaldehyde is in combined form, with at least 60% in the form of methylol compounds;
(d) discontinuing the addition of alkali and continuing said heating until at least 50% and no more than 80% of the formaldehyde is in the form of methylene groups;
(e) diluting with water the resulting reaction product to about 35–65% by weight of urea-formaldehyde;
(f) adding an acidic material to said reaction product to adjust the pH thereof to 2.5 at 36° C.;
(g) heating the acidified reaction product to a temperature within the range of 36–41° C. for 56 minutes; and
(h) adding an alkaline material to said heated reaction product so as to raise the pH to between 5 and 8 to produce a ureaform suspension having a water-insoluble nitrogen content of 5.1% and an activity index of 60.

3. A process for producing a liquid fertilizer suspension containing ureaform having a water-insoluble nitrogen content of 4.2% and an activity index of 65 which comprises:

(a) preparing an aqueous mixture of urea and formaldehyde having a urea:formaldehyde mol ratio of 1.6;

(b) adding ammonia in an amount of 1.8% by weight;

(c) heating said mixture at a temperature between about 75° C. and boiling while maintaining the pH of said mixture in the range about 8.5 to 10 by the addition of strong alkali until at least 90% of the formaldehyde is in combined form, with at least 60% in the form of methylol compounds;

(d) discontinuing the addition of alkali and continuing said heating until at least 50% and no more than 80% of the formaldehyde is in the form of methylene groups;

(e) diluting with water the resulting reaction product to about 35–65% by weight of urea-formaldehyde;

(f) adding an acidic material to said reaction product to adjust the pH thereof to 2.35 at 39° C.;

(g) heating the acidified reaction product to a temperature within the range of 39–43° C. for 60 minutes; and (h) adding an alkaline material to said heated reaction product so as to raise the pH to between 5 and 8 to produce a ureaform suspension having a water-insoluble nitrogen content of 4.2% and an activity index of 65.

References Cited

UNITED STATES PATENTS

| | | | |
|---|---|---|---|
| 3,096,168 | 7/1963 | Waters | 71—28 |
| 3,462,256 | 8/1969 | Jushie et al. | 71—28 |

REUBEN FRIEDMAN, Primary Examiner

R. BARNES, Assistant Examiner

U.S. Cl. X.R.

71—64 C

PO-1050
(5/69)

UNITED STATES PATENT OFFICE
CERTIFICATE OF CORRECTION

Patent No. 3,677,736 Dated July 18, 1972

Inventor(s) Richard E. Formaini

It is certified that error appears in the above-identified patent and that said Letters Patent are hereby corrected as shown below:

Column 3, line 9, "udesirable" should be --undesirable--.

Column 4, line 19, "condtiions" should be --conditions--.

Column 6, claim 1, lines 19 and 20 "(a) preparing an aqueous mixture of urea and formaldehyde a urea:formaldehyde mol ratio of 1.6;" should be --(a) preparing an aqueous mixture of urea and formaldehyde having a urea:formaldehyde mol ratio of 1.6;--.

Signed and sealed this 26th day of December 1972.

(SEAL)
Attest:

EDWARD M.FLETCHER,JR.
Attesting Officer

ROBERT GOTTSCHALK
Commissioner of Patents